United States Patent
Lin et al.

(10) Patent No.: US 6,960,910 B2
(45) Date of Patent: Nov. 1, 2005

(54) METHOD FOR PHASE MATCHING BY DETECTING MAGNETIC FLUX

(75) Inventors: Tung-Lung Lin, Taipei Hsien (TW); Chih-Tsung Liu, Tao-Yuan (TW); Sen-Chih Chan, Tao-Yuan Hsien (TW)

(73) Assignee: BenQ Corporation, Tao-Yuan Hsien (TW)

( * ) Notice: Subject to any disclaimer, the term of this patent is extended or adjusted under 35 U.S.C. 154(b) by 28 days.

(21) Appl. No.: 10/605,252

(22) Filed: Sep. 18, 2003

(65) Prior Publication Data

US 2004/0113610 A1    Jun. 17, 2004

(30) Foreign Application Priority Data

Sep. 20, 2002   (TW) .................................. 91121694

(51) Int. Cl.[7] .......................... G01B 7/14; G01B 7/30; G01R 33/06; H01L 43/06
(52) U.S. Cl. ............................. 324/207.26; 324/207.2; 324/207.21; 81/54; 81/57.4
(58) Field of Search ...................... 324/207.11, 207.12, 324/207.2–207.21, 207.22–207.26, 260, 324/261, 228; 81/54, 57.4, 451, 463, 436, 81/57.24; 29/284; 408/13

(56) References Cited

U.S. PATENT DOCUMENTS

| 3,849,724 A | * | 11/1974 | Ghibu et al. ............ 324/207.14 |
| 3,902,114 A | * | 8/1975 | Alich .......................... 324/224 |
| 4,000,448 A | * | 12/1976 | Shum et al. .................. 318/39 |
| 4,401,945 A | * | 8/1983 | Juengel ................. 324/207.14 |
| 4,408,933 A | * | 10/1983 | Tomita et al. .................. 408/8 |
| 4,562,756 A | * | 1/1986 | Otsuki et al. ................ 81/57.4 |
| 4,657,451 A | * | 4/1987 | Tanaka ....................... 409/186 |
| 4,878,020 A | * | 10/1989 | Karna et al. ............ 324/207.17 |
| 5,521,497 A | * | 5/1996 | Schneider et al. ..... 324/207.22 |
| 6,060,880 A | * | 5/2000 | Guyot et al. ............. 324/207.2 |
| 6,600,310 B2 | * | 7/2003 | Nyce et al. ............. 324/207.23 |
| 6,681,659 B2 | * | 1/2004 | Hoe et al. ....................... 81/54 |
| 2001/0009366 A1 | * | 7/2001 | Kono et al. .............. 324/207.2 |

* cited by examiner

Primary Examiner—Edward Lefkowitz
Assistant Examiner—Kenneth J. Whittington
(74) Attorney, Agent, or Firm—Winston Hsu

(57) ABSTRACT

A method for phase matching matches a relative phase of a first element and a second element by detecting a magnetic flux. The method provides a magnetic flux generator to generate the magnetic flux. The method also provides a magnetic sensor in order to detect the magnetic flux. According to the magnetic flux detected by the magnetic sensor, the relative position of the first element and the second element is adjusted until the magnetic flux reaches a predetermined value, which means that the phase of the first element and that of the second element are matched.

10 Claims, 8 Drawing Sheets

METHOD FOR PHASE MATCHING BY DETECTING MAGNETIC FLUX

BACKGROUND OF INVENTION

1. Field of the Invention

The invention relates to a method for phase matching, and more particularly, to a method for phase matching between a first element and a second element by detecting a magnetic flux.

2. Description of the Prior Art

In industry, many electronic products or mechanical products contain some devices or elements that need to be fine-tuned under different situations and applications in order to optimize the performance of the product. In actual applications of fine-tuning, screws are usually chosen as a preferred medium. This is because screws have the advantages of simplicity of structure and low cost. And most importantly, a screw has the characteristic of transferring a rotational phase variation along a vertical axis of its body into a positional variation along the vertical axis with respect to an object where the screw is installed. By designing the distance between threads (or pitch) of a screw, the ratio of the phase variation with respect to the positional variation can be set as a large value, which means, when the screw rotates along a vertical axis of its body with a large phase variation, the relative positional variation will have a rather small quantity. If the phase variation is used as a fine-tuning mechanism (for example, by rotating the screw with a screwdriver), and the positional variation is related to a status variation of a device or an element of mechanical or electrical design that needs to be tuned (for example, a vertical displacement of a rod, or a resistance of a variable resistor), a very precise fine-tuning process can be achieved through the above setting. According to the characteristics of screws mentioned above, screws are quite suitable for fine-tuning applications.

The relationship between a screw and a screwdriver used for rotating the screw is described as follows. The screw will receive a torque along an axis given by the screwdriver to perform the phase variation, and this usually depends on the geometrical shape of a recess of the screw being matched with the geometrical shape of a screw bit of the screwdriver. Due to the nature of the recess of an ordinary screw (usually a cross-shaped recess or a slotted recess), before the screwdriver can have a perfect match with the screw and start to actually give a torque to the screw and successfully change its phase, the screwdriver has to rotate with an angle such that the relative position of the bit and the recess match. But, since the relative positions of screws and the screwdriver before every matching process are different, the angle rotated has an unpredictable value. This situation causes great trouble for an assembly line executed fine-tuning process with an automatic controlling program. In an assembly line procedure when a device is set to be fine-tuned to a certain degree, and the fine-tuning process is implemented through a certain phase variation of a screw in the device made by a screwdriver, the above-mentioned unpredictability of the angle then becomes an error factor of the fine-tuning process. The automatic controlling program is not able to determine the angle deviation and cannot compensate for it with the rotation of the screwdriver, causing error in the actual tuning result from the expected tuning degree. This error is usually, for a fine-tuning process, unacceptable. According to the prior art, in order to alleviate problems caused by this fine-tuning error, screws having more slots in their recesses (for example, six slots or more) are usually used for reducing the unpredictable angle so as to reduce the error. Alternatively, screws with a sophisticated recess structure along with corresponding screwdrivers are designed to perform a series of mechanical matching procedures that can insure the transfer of the torque on the screw from the very beginning of the rotation of the screwdriver.

However, screws having more slots in their recesses or screws with sophisticated recess structures are not easily obtained. Additional custom-made assembly lines are needed and the manufacturing processes are more complicated than ordinary screws, so costs of these screws are high. Additionally, screws having more slots in their recesses do not even fully eliminate the error but rather reduce it to an acceptable range. They are not the ideal fine-tuning tools for mass production assembly lines.

SUMMARY OF INVENTION

It is therefore a primary objective of the claimed invention to provide a method for phase matching between a first element and a second element by a detecting magnetic flux, different magnitudes of magnetic fluxes being detected for different flux routes caused by different spatial geometrical relative positions, to solve the above mentioned problems.

According to the claimed invention, a method for phase matching between a first element and a second element by detecting a magnetic flux comprises the following steps. First, the first element and the second element are positioned. Then, a magnetic flux generator is provided for generating a magnetic flux between the first and second elements. A magnetic sensor is then provided for detecting the magnetic flux between the first and the second elements. Finally, a relative position of the first and the second elements is adjusted until the magnetic flux detected by the magnetic sensor reaches a predetermined value.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
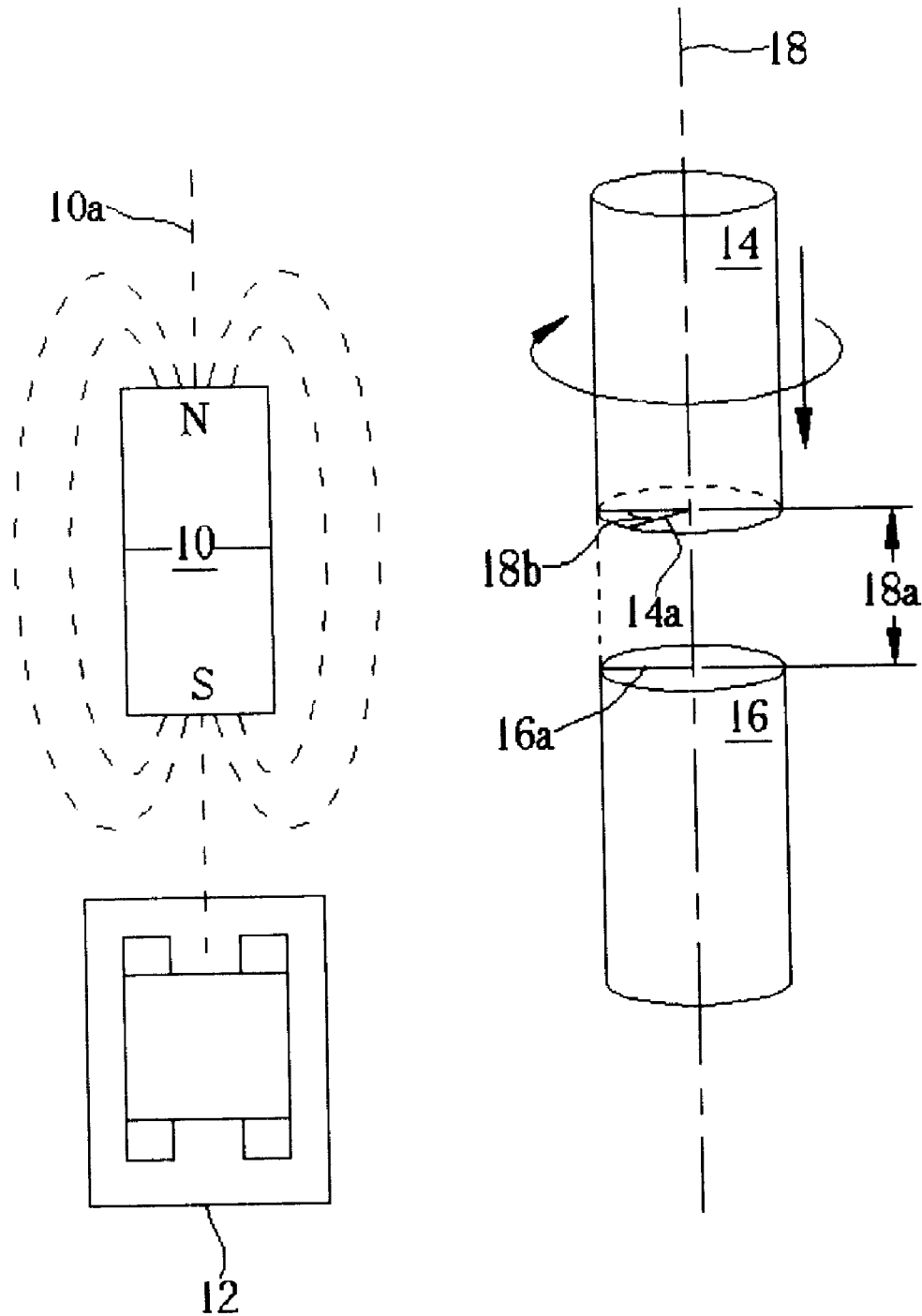
FIG. 1 is a diagram of a method for phase matching according to the present invention.

Please refer to FIG. 1. FIG. 1 shows a diagram of a method for phase matching according to the present invention, specifically, a method for matching a relative phase between a first element 14 and a second element 16. A magnetic field 10a is provided in a background space where the first element 14 and the second element 16 are located by using a magnetic flux generator 10, and therefore any point in the background space has a magnetic flux value due to the existence of the magnetic field 10a. Further provided is a magnetic sensor 12 in the background space for detecting the magnetic flux at a point where the sensor 12 is located. When the first element 14 is rotated about and shifted along a vertical axis 18 at the same time, and the matching condition of the phase between the first element 14 and the second element 16 is determined according to the magnetic flux detected by the magnetic sensor 12. Detailed operating procedures of the method for phase matching are described as follows.

Figure 2:
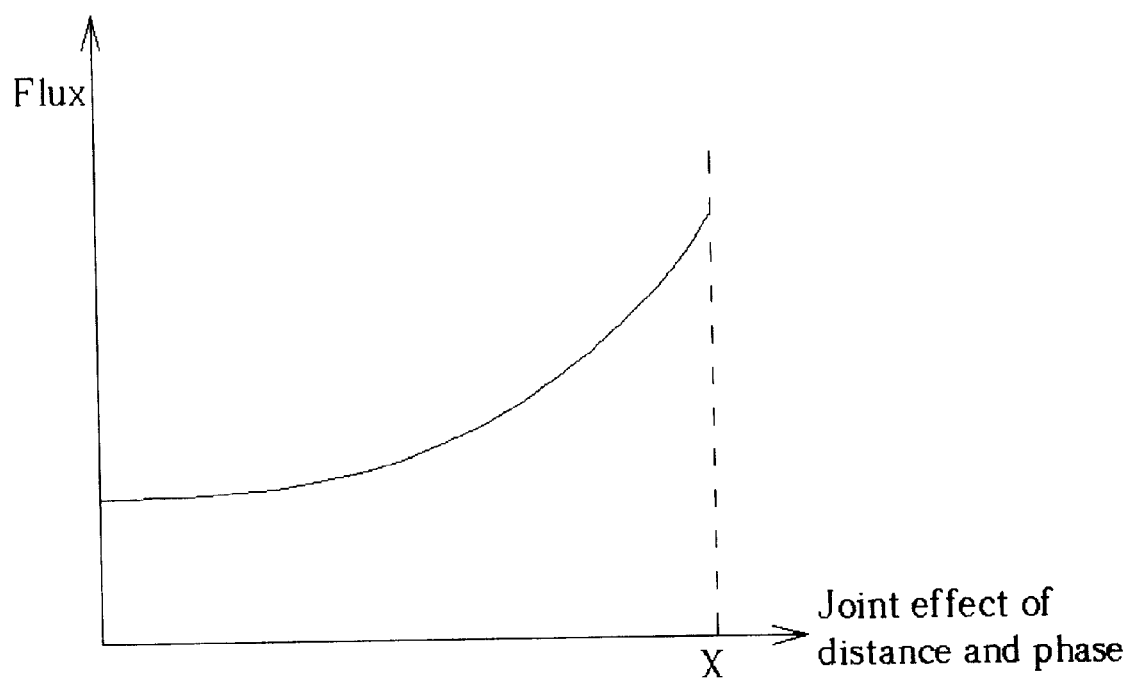
FIG. 2 is a graph showing magnetic flux detected with respect to a joint effect of distance and phase between the two elements in FIG. 1.

Please refer to FIG. 1 and FIG. 2. The first element 14 and the second element 16 are shown in FIG. 1. The method for phase matching adjusts a relative position and a relative phase between the first and second elements 14, 16 along a horizontal direction and a rotational direction of a vertical axis 18 into a certain status. In order to determine whether the relative position and phase between the first and second elements 14, 16 have reached the certain status, a first matching line 14a perpendicular to the vertical axis 18 is defined. The shift amount and direction along the vertical axis 18 of the first matching line 14a is equal to the shift amount and direction along the vertical axis 18 of the first element 14, and the rotation amount and direction about the vertical axis 18 of the first matching line 14a is equal to the rotation amount and direction along the vertical axis 18 of the first element 14. A second matching line 16a perpendicular to the vertical axis 18 is further defined. The shift amount and direction along the vertical axis 18 of the second matching line 16a is equal to the shift amount and direction along the vertical axis 18 of the second element 16, and the rotation amount and direction about the vertical axis 18 of the second matching line 16a is equal to the rotation amount and direction along the vertical axis 18 of the second element 16.

After defining the first and second matching lines 14a, 16a, a distance 18a is defined as the distance from the first matching line 14a to the second matching line 16a along the vertical axis 18. At the same time assume that when the distance 18a reaches a predetermined value, the relative position between the first and second elements 14, 16 has reached the certain status. A phase angle 18b is further defined as the angle from the first matching line 14a to the second matching line 16a along the clockwise direction of the vertical axis 18. At the same time assume that when the phase angle 18b reaches 0, the relative phase between the first and second elements 14, 16 has reached the certain status, which means the phase between the first and second elements 14, 16 matches.

In order to achieve the purpose of position and phase matching, the magnetic flux generator 10 is set in the background space where the first and second elements 14, 16 are located, and therefore any point in the background space has a corresponding magnetic flux value due to the existence of the magnetic field 10a. At the same time the magnetic sensor 12 is also set in the background space and is used for detecting the magnetic flux where the sensor 12 is located. Since the structure, geometry, and materials of the first and second elements 14, 16 are different according to different applications, different relative positions and phase conditions between the two result in different magnitudes of magnetic flux in the background space. Based on the phenomenon described above, variation of the magnetic flux detected by the magnetic sensor 12 with respect to the relative distance 18a along with the relative phase angle 18b between the first and second elements 14, 16 can be used as a reference for determining whether the phases of the first and second element 14, 16 are matched.

Shown in FIG. 2 is an example of the above-mentioned magnetic flux with respect to a joint effect of the distance 18a and the phase angle 18b. When the distance 18a between the two elements 14, 16 reaches the predetermined value and the phase angle 18b reaches 0 degree (or 360 degrees), the magnetic flux reaches a maximum value (point X in FIG. 2). So if the magnetic flux detected by the magnetic sensor 12 is the maximum value, the first and second elements 14, 16 have reached the certain position and their phases match. The locations of the magnetic flux generator 10 and the magnetic sensor 12 can be chosen according to what kind of design the magnetic sensor 12 is able to detect a significant magnetic flux variation so as to measure useful magnetic field information. For example, the magnetic flux generator 10 can be installed on one end of the second element 16 and the magnetic sensor 12 on one end of the first element 14. Likewise, the magnetic flux generator 10 can be installed on one end of the first element 14 and the magnetic sensor 12 on one end of the second element 16.

The magnetic flux generator 10 is usually a magnet, while the magnetic sensor 12 is usually a Hall element. However, the magnetic sensor 12 could also be another device such as an MR device or a magnetic diode that can translate the magnetic flux detected into a readable signal. Even though the structures, shapes, and materials of the first and second elements 14, 16; the location and strength of the magnetic flux generator 10; and the location, species, and detecting ability of the magnetic sensor 12 all affect the relationship shown in FIG. 2, through appropriate design the present invention method can always be used for matching the relative phase between the first and second elements 14, 16.

Figure 3:
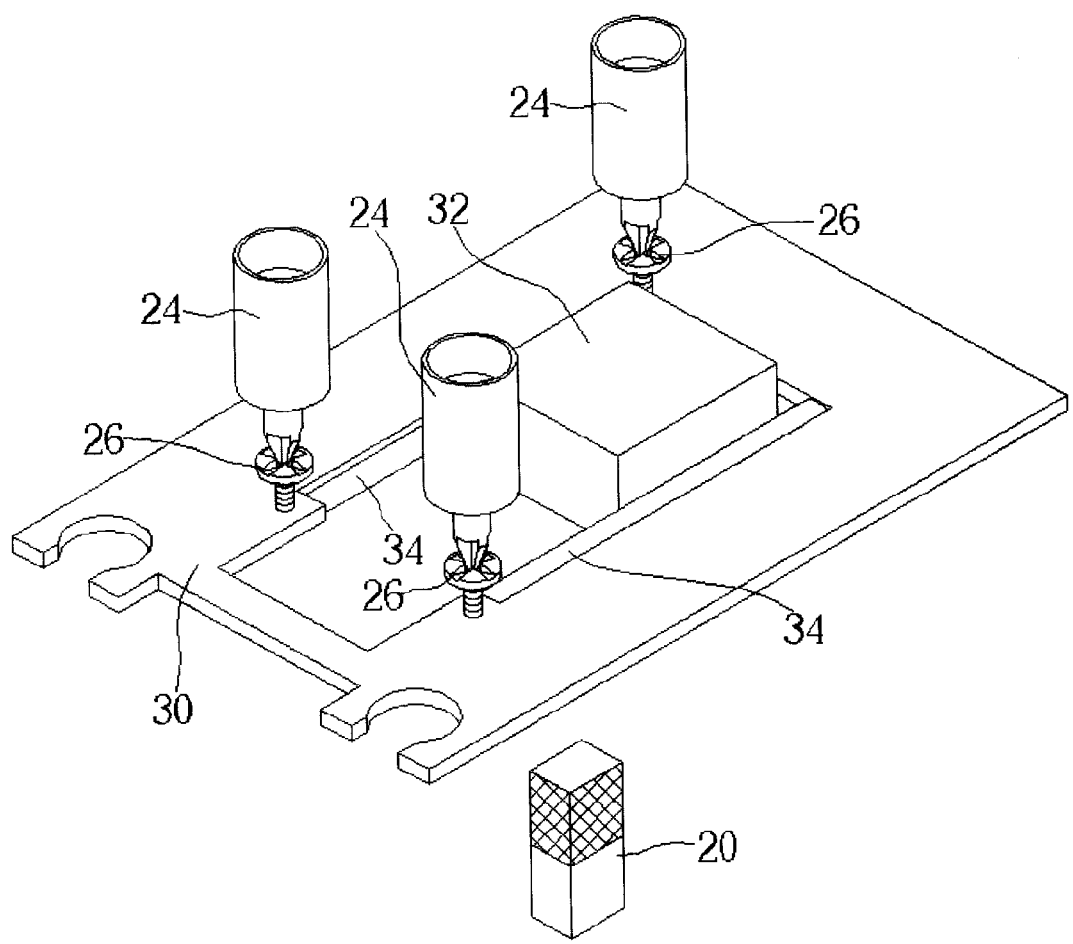
FIG. 3 is a perspective view of the method for phase matching in FIG. 1 implemented for phase matching between a screw and a screwdriver.

FIG. 3 shows a preferred embodiment of the method for phase matching shown in FIG. 1. A device 32 that needs to be fine-tuned is installed on a metal plate 30. Two connecting rods 34 are mechanically connected to a tuning mechanism of the device 32. Three screws 26 are used for fine-shifting the two connecting rods 34 by transferring their phase variations along a vertical axis of their bodies into positional variations along the vertical axis, such that the purpose of fine-tuning towards the device 32 can be achieved. A magnet 20 is also included for generating a magnetic field, and three screwdrivers 24 are provided for transferring torque to the screws 26.

Figure 4:
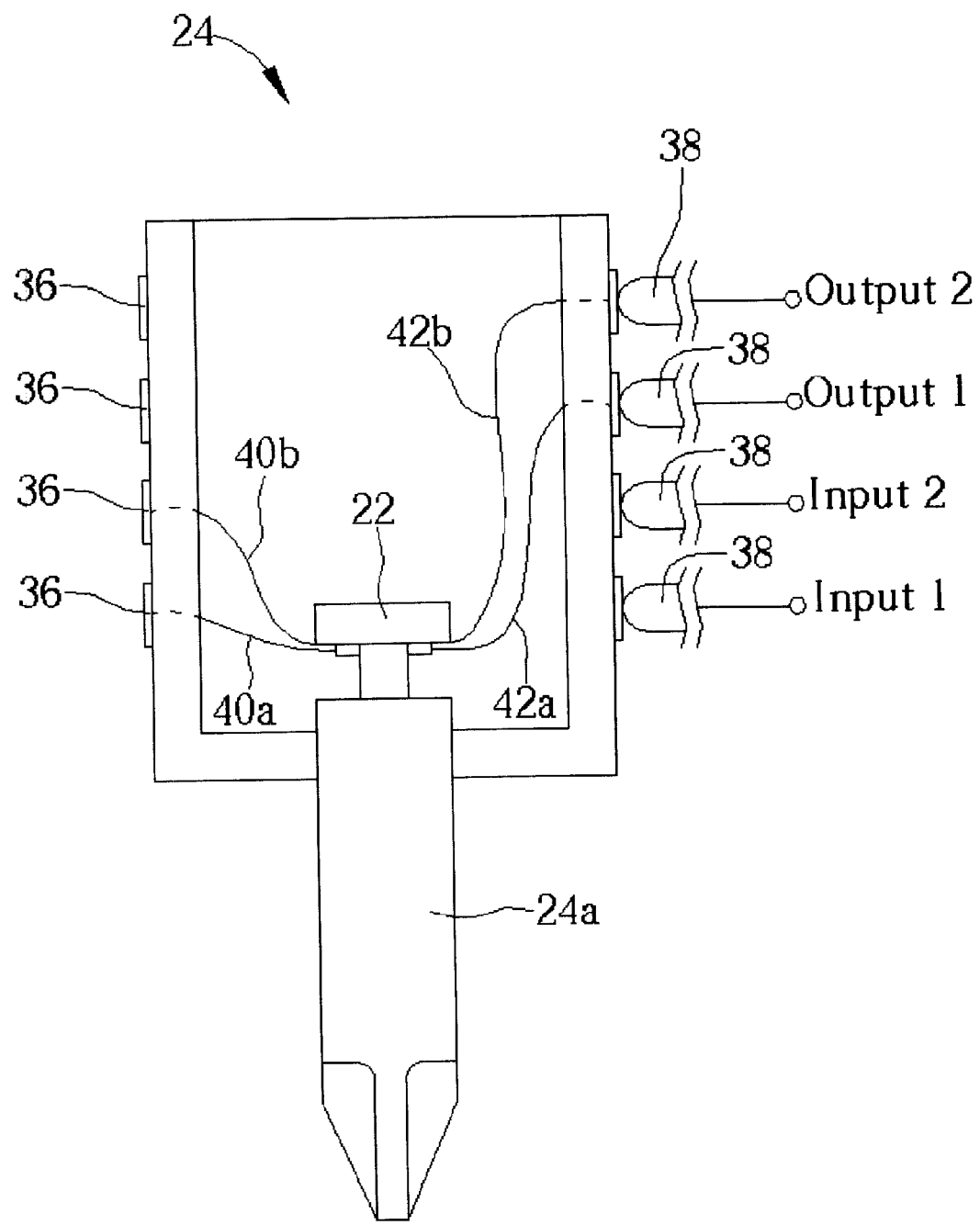
FIG. 4 is a cross-sectional view of the screwdriver in FIG. 3.

FIG. 4 shows a cross-sectional view of the screwdrivers 24 in FIG. 3. The screwdriver 24 comprises a screw bit 24a for directly applying torque to the screw 26. The screwdriver 24 also comprises a Hall element 22 connected to one end of the screw bit 24a and used for converting a voltage inputted from input nodes 40a, 40b into a voltage outputted by output nodes 42a, 42b according to the magnetic flux detected by the Hall element 22. The screwdriver 24 further comprises four armatures 36 connected to the input nodes 40a, 40b and output nodes 42a, 42b, respectively, and four brushes 38. The armatures 36 in conjunction with the brushes 38 insure the continuity of the input and output of the voltage signals during the rotation of the screwdriver 24.

Figure 5:
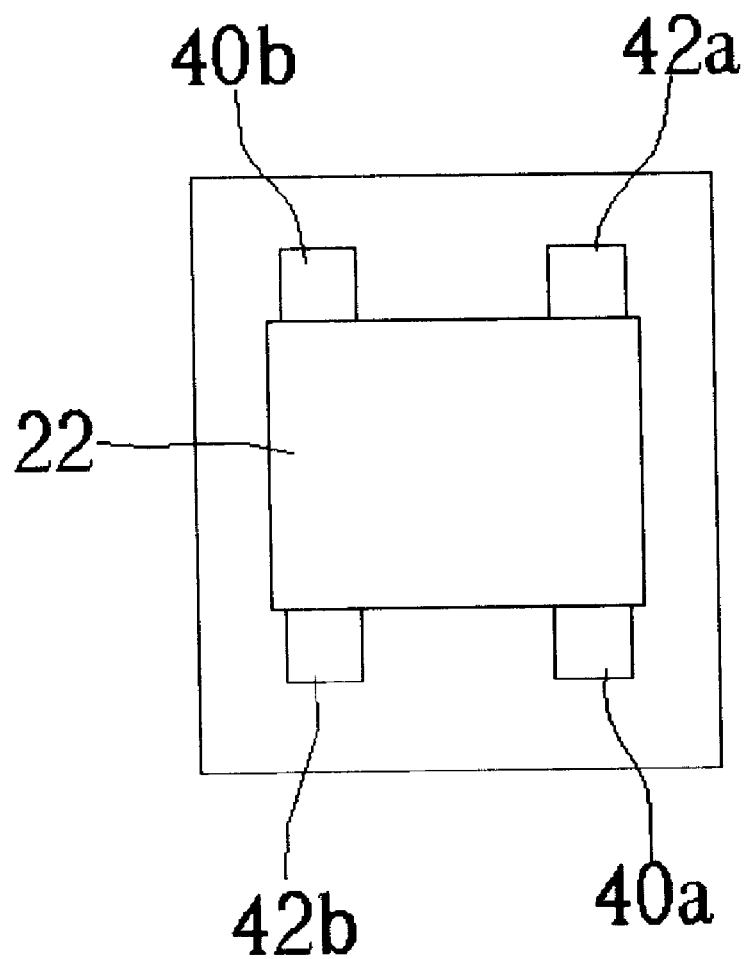
FIG. 5 is a top view of the Hall element in FIG. 4.
Figure 6:
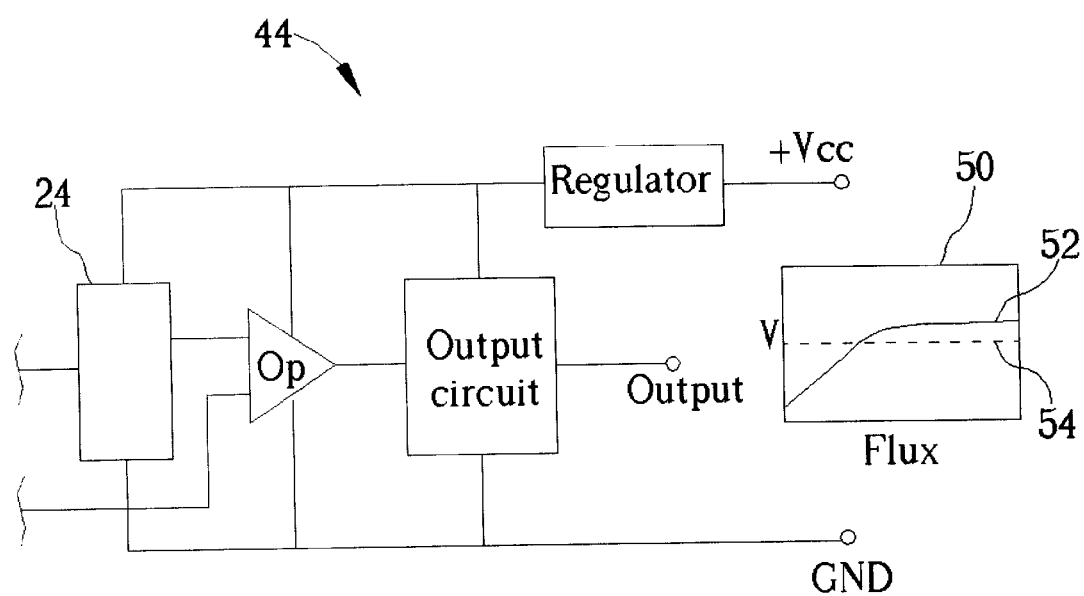
FIG. 6 is a block diagram of an amplification circuit used for amplifying a voltage signal generated by the Hall element in FIG. 4.

FIG. 5 shows a top view of the Hall element 22 in FIG. 4. The voltage outputted from the output nodes 42a, 42b of the Hall element 22 can be amplified by an amplification circuit 44 shown in FIG. 6 for the convenience of being read out by the automatic controlling program of the assembly line. In this preferred embodiment, after being amplified by the amplification circuit 44 the voltage signal outputted by the Hall element 22 can be represented by a relationship 50 of a voltage with respect to the magnetic flux detected by the Hall element 22. By examining a curve 52 in the relationship 50 one can tell that, when the magnetic flux increases, the voltage increases until reaching a saturated value.

Figure 7:
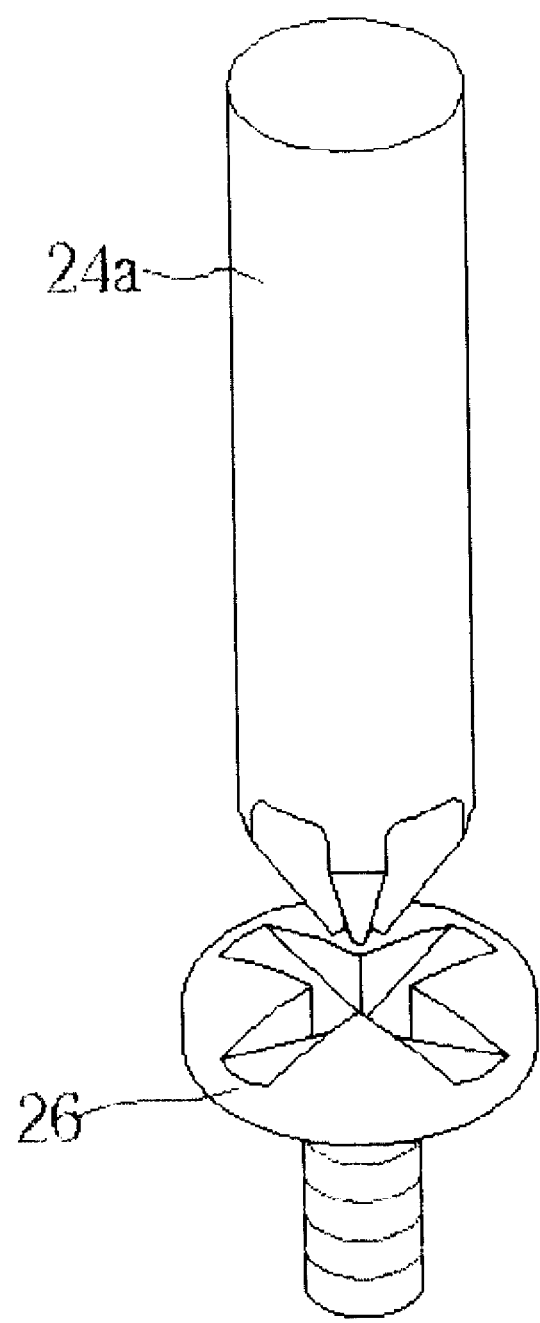
FIG. 7 is a perspective view of the screw and the screw bit in FIG. 3 when they are not matched.
Figure 8:
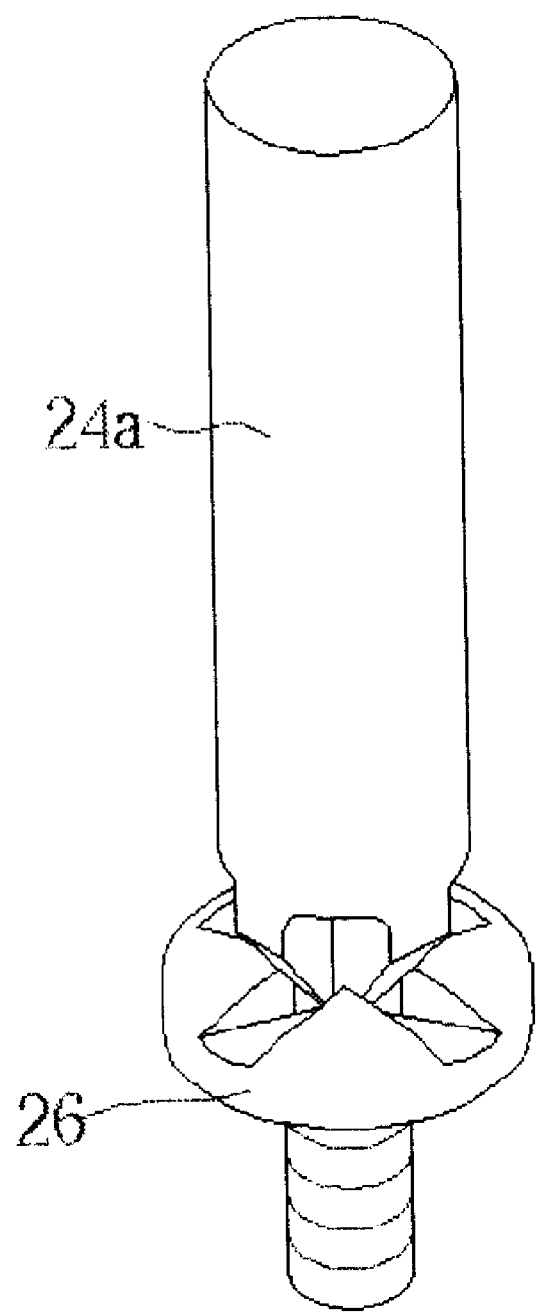
FIG. 8 is a perspective view of the screw and the screw bit in FIG. 3 when they are matched.

Please refer to FIG. 7 and FIG. 8. Please note, in order to obtain a more significant amount of magnetic flux variation, metals with higher magnetic permeability (such as iron or nickel, etc) should be chosen as materials for the screw 26 and the screw bit 24a. FIG. 7 shows a perspective view of the screw 26 and the screw bit 24a in FIG. 3 when they are not matched. When the screw 26 and the screw bit 24a are not matched, except that a small area of the surface of the screw bit 24a is in close proximity to the recess of the screw 26, parts of the screw bit 24a are far away from the recess. This results in a significant air gap between the screw 26 and the screw bit 24a, which means when the magnetic flux flows through the screw 26 and reaches the screw bit 24a, a route with significant air gap must be traversed. Conversely, FIG. 8 shows a perspective view of the screw 26 and the screw bit 24a in FIG. 3 when they are matched. When the screw 26 and the screw bit 24a are matched, since they are perfectly in contact, the air gap between them is quite small. This means, when the magnetic flux flows through the screw 26 and reaches the screw bit 24a, a route with less air gap is traversed.

Metals with higher magnetic permeability are chosen for the materials of the screw 26 and the screw bit 24a, their permeability (i.e. ability to induce magnetic flux) being much higher than that of air. When the route of the magnetic flux contains more air gap parts, the magnetic flux will be relatively small, while when the route of the magnetic flux contains fewer air gap parts, the magnetic flux will be relatively larger. Therefore, in the process of rotating the screwdriver 24 starting from the state that the screw 26 and the screw bit 24a are not matched until the state that they are perfectly matched, the magnetic flux flowing through the screw 26 and the screw bit 24a increases from a small value to a larger value. Accordingly, the voltage signal generated by the Hall element 22 detecting the magnetic flux will enter a saturated value, as shown by the curve 52 of the relationship 50. When the automatic controlling program is properly designed and provides a threshold voltage 54 that is close to and smaller than the saturated value, then when the voltage signal generated by the Hall element 22 detecting the magnetic flux reaches the threshold voltage 54, the automatic controlling program can determine that the screw 26 and the screw bit 24a have matched and the actual fine-tuning process can be started.

In contrast to the prior art that uses screws with more slots in their recesses or screws with sophisticated recess structures to insure the phase match between the screw bit and the screw recess before the actual fine-tuning process is begun to eliminate errors of fine-tuning, the present invention has the advantage of lower cost.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for phase matching between a screw bit of a screwdriver and a screw recess of a screw by detecting a magnetic flux, the screw bit and the screw both being formed out of magnetic permeable material, the method comprising:
   aligning the screw bit and the screw such that a first axis extends through the screw bit and the screw;
   providing a magnetic flux generator for generating a magnetic flux between the screw bit and the screw;
   providing a magnetic sensor for detecting the magnetic flux between the screw bit and the screw; and
   moving the screw bit toward the screw along the first axis for inserting the screw bit into the screw recess until the magnetic flux detected by the magnetic sensor reaches a predetermined value.

2. The method of claim 1 wherein the magnetic flux generator is a magnet.

3. The method of claim 1 wherein the magnetic sensor is a Hall element for converting the magnetic flux into a corresponding voltage signal.

4. The method of claim 3 further comprising providing an amplifier for amplifying the voltage signal outputted from the Hall element.

5. The method of claim 1 wherein the magnetic sensor is a magnetic resistance device (MR device) having a resistance that changes according to a magnitude of the magnetic flux.

6. The method of claim 1 wherein the magnetic sensor is a magnetic diode, and a current flowing though the magnetic diode changes according to a magnitude of the magnetic flux.

7. The method of claim 1 wherein the screw is installed on a metal plate.

8. The method of claim 7 wherein the magnetic flux generator is positioned on the metal plate and the magnetic sensor is set on one end of the screwdriver.

9. The method of claim 1 wherein the magnetic flux generator is set on one end of the screwdriver and the magnetic sensor is set on one end of the screw.

10. The method of claim 1, wherein as the screw bit is inserted into the screw recess, the screw bit is rotated to fit into the screw recess, thereby phase matching the screw bit and the screw recess.

* * * * *